(12) United States Patent
Ozanoglu et al.

(10) Patent No.: US 7,274,523 B2
(45) Date of Patent: Sep. 25, 2007

(54) READ HEAD PREAMPLIFIER WITH THERMAL ASPERITY TRANSIENT CONTROL

(75) Inventors: Kemal Ozanoglu, Palo Alto, CA (US);
Baris Posat, Cupertino, CA (US);
Roberto Allni, Dublin, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 437 days.

(21) Appl. No.: 10/815,135

(22) Filed: Mar. 31, 2004

(65) Prior Publication Data

US 2005/0219725 A1    Oct. 6, 2005

(51) Int. Cl.
*G11B 5/02* (2006.01)
*G11B 5/09* (2006.01)

(52) U.S. Cl. .......................................... 360/25; 360/46
(58) Field of Classification Search ...................... None
See application file for complete search history.

(56) References Cited

U.S. PATENT DOCUMENTS

| | | | |
|---|---|---|---|
| 5,497,111 A * | 3/1996 | Cunningham ................. 327/58 |
| 5,818,656 A | 10/1998 | Klaassen et al. |
| 6,051,997 A * | 4/2000 | Yeung et al. ................. 327/58 |
| 6,104,331 A | 8/2000 | Ishida et al. |
| 6,252,459 B1 * | 6/2001 | Franck ........................ 330/294 |
| 6,255,898 B1 | 7/2001 | Ono et al. |
| 6,359,743 B1 | 3/2002 | Patti et al. |
| 6,381,082 B1 * | 4/2002 | Voorman et al. ............... 360/25 |
| RE37,751 E * | 6/2002 | Sutardja ....................... 327/100 |
| 6,446,236 B1 * | 9/2002 | McEwen et al. ............. 714/795 |
| 6,735,260 B1 * | 5/2004 | Eliezer et al. ............... 375/316 |
| 2002/0008928 A1 * | 1/2002 | Takahashi ..................... 360/53 |
| 2002/0085298 A1 | 7/2002 | Sobey |
| 2002/0122265 A1 * | 9/2002 | Chambers et al. ............ 360/67 |
| 2003/0007268 A1 | 1/2003 | Smith |

OTHER PUBLICATIONS

Klaasen, K.B., van Peppen, J.C.L., "Electronic Abatement of Thermal Interference in (G)MR Head Output Signals", IEEE Transactions on Magnetics, vol. 33, No. 5, Sep. 1997, pp. 2611-2616.

* cited by examiner

*Primary Examiner*—William Korzuch
*Assistant Examiner*—Daniell L. Negrón
(74) *Attorney, Agent, or Firm*—Lisa K. Jorgenson; William J. Kubida

(57) ABSTRACT

A preamplifier for correcting for thermal asperity transients in disk drives using magneto resistive read heads. The preamplifier has an input gain stage receiving a signal from the read head and an output buffer outputting a reader output to a read channel that is filtered of thermal asperity transients by a high pass filter positioned between the input gain stage and the output buffer. The high pass filter is voltage controlled based on an input control signal from a filter controller. The filter controller uses a low pass filter functioning as a peak detector to detect peaks in either the input or output voltage of the high pass filter. The low pass filter output is applied to a non-linear function generator generating the control signal for the high pass filter based on an increasing function of the absolute value of the low pass filter output.

10 Claims, 3 Drawing Sheets

READ HEAD PREAMPLIFIER WITH THERMAL ASPERITY TRANSIENT CONTROL

BACKGROUND OF THE INVENTION

1. Field of the Invention

The present invention relates, in general, to magneto resistive read heads and hard disk drives, and, more particularly, to a method and apparatus for providing dynamic correction of thermal asperity transients experienced in hard disk drive read heads with a modified preamplifier.

2. Relevant Background

The demand for improved data storage techniques and systems continues to rapidly grow. Hard disk drives utilizing magneto resistive (MR) heads to read and write data onto one or more spinning magnetic platters or disks are one of the more important and wide spread devices in the data storage industry. Hard disk drives may be used in many applications, including enterprise computer systems, personal computers, set top boxes, audio, video, or television applications, and many other large and small computer devices. Many applications are still being developed, and the uses for hard disk drives are expected to increase.

Generally, a hard disk drive system includes a rotating magnetic disk on which information is recorded with a write head. A read transducer or read head is movably supported adjacent the magnetic disk for reading the prerecorded information from the disk. The read head typically flies above the surface of the disk, being supported by an "air bearing" that is created by the spinning disk and the transducer does not touch the surface of the disk in normal operation.

Large portions of the read heads in use today are magneto resistive (MR) heads. The term "magneto resistance" refers to the change in resistivity of the materials of the head in the presence of the magnetic field induced in the head by the magnetic domains recorded on the disk. The use of MR heads in hard disk drives has significantly increased the areal density or density of recorded data on the disk surfaces. Unfortunately, the use of MR heads has been accompanied with a number of operating problems that can create sources of error that can degrade the achievable performance, e.g., the achievable bit error rate performance, of a hard disk drive.

With the low flying heights of the read head, it is inevitable that the head will collide with small particles or with rougher portions of the disk surface creating a "thermal asperity" that in turn can cause permanent bit errors or data reading errors caused by larger thermal asperity transients in the read signal generated by the read head. A thermal asperity results when a metal particle, disk defect, or the like nearly or actually collides with the MR read head, momentarily raising the temperature of the sensor or head. The heat conducted into the MR sensor then diffuses relatively slowly. The rapid rise in temperature changes the MR resistance and results in a voltage transient in the output from the read head. When superimposed on the normal read signal, the resultant shape shows a rapid rise in voltage followed by an exponential-like decay.

If the disk surface or an asperity momentarily comes closer to the MR read element without touching it, an increase in the cooling effect may occur in the MR head. The resulting change in resistance of the MR head material can also cause a thermal asperity transient similar to that produced by the head heating effects but in the opposite direction.

Efforts have been made, with varying results, to reduce the effects of thermal asperities. Physically, efforts have been made to reduce the flash temperature that results from a collision between the head and the disk or a defect by reducing the dynamic friction, the slider dimensions, and the interaction height. Lowering the interaction height requires smoother disks, fewer "glide escapes", lower particle count and less contamination and debris. Other physical measures have been taken, as well, including designing the heads to have a high magnetic sensitivity, a low effective temperature coefficient, and a wide track width. Some proposals even include using a second, dummy sensor away from the air-bearing surface of the main sensor to provide a reference against which the output of the main sensor can be compared. Differentially sensed dual stripe heads were also used to partially cancel the thermal asperity effects. However, the industry trends of lowering the flying heights and increasing the slider-disk velocities have offset any improvements that were achieved from these physical efforts resulting in a continued need for a technique of correcting for thermal asperity transients.

In addition to the physical measures, compensation measures or correction circuitry has been provided in the read channel or the read/write controller of the hard disk drive system. Both "on-the-fly" and "re-try" types of compensation within the read channel have been used in an attempt to lessen the impact of the thermal asperity effects. The on-the-fly methods include analog read channel front-end processes aimed at processing the thermal asperity events such that they become invisible to the rest of the channel. In some read channel embodiments, thermal asperity is detected by comparing read signals from the preamplifier with a threshold value, with detection sometimes being enhanced with energy level determinations and disk mapping. High pass filters are then used in the read channel to cut off low-frequency components of the signal produced by the preamplifier, and such filters are used alone or in combination in the read channel with automatic gain control circuits and error correction code circuits. The re-try methods include recovery steps that are implemented at the system level as part of a data recovery procedure. These compensation methods and circuits have not satisfactorily addressed signal shifts caused by thermal asperity transients and often result in undesirable added costs and complexity in designing and manufacturing read/write channels for hard disk drive systems.

Hence, there remains a need for an improved method and apparatus for more effectively correcting for thermal asperity transients associated with the use of MR read heads in hard disk drive systems. Preferably, such improved methods and systems would be relatively simple to implement to control design and manufacturing costs as well as control increases in use of chip real estate or circuit space. Further, it is desirable that such an improved corrective method and apparatus be dynamic rather than tied to a one time mapping of a disk to adjust to thermal asperity transients that vary both in amplitude and in time.

SUMMARY OF THE INVENTION

The present invention addresses the above problems by providing a method and associated circuitry or components for correcting for thermal asperity transients in a hard disk drive assembly. Transient correction is provided within a magneto resistive (MR) read head preamplifier having an input gain stage that receives a signal from the MR read head and an output buffer that outputs a reader output to a read channel. The reader output is filtered, at least partially, of thermal asperity transients by a high pass filter positioned between the input gain stage and the output buffer device. The high pass filter is voltage controlled based on an input control signal from a filter controller. The filter controller uses a low pass filter functioning as a peak detector to detect peaks in either the input voltage (i.e., the output of the input gain stage) or the output voltage of the high pass filter. The output of the low pass filter is applied to a non-linear function generator that generates the control signal for the high pass filter based on a sharply increasing function of the absolute value of the output of the low pass filter.

In one embodiment, a method is provided for dynamic correction of thermal asperity transients in MR read head output signals. The method includes receiving an output signal from an MR read head and processing the signal through a gain stage to generate a filter input signal, e.g., a filter input voltage. The method also involves detecting a peak in the filter input signal (or in some embodiments, in a filter output signal), with the peak indicating the presence of a thermal asperity transient in the MR read head output signal. A control signal is then generated based on the results of the peak detection. The method further includes filtering the filter input signal based on the control signal to produce a filtered MR read head signal that is typically buffered and then transmitted to a read channel for further processing.

In some embodiments of the invention, the filtering is performed by applying a voltage controlled high pass filter to the filter input signal, with the high pass filter being dynamically operated in response to the control signal. The detecting is typically performed by applying the filter input signal (or filter output signal) to a low pass filter. The control signal is generated by applying the output of the low pass filter to a non-linear function generator (such as one that comprises $(|V_{IN}|/V_C)^4$ or $e^{|V_{IN}|/V_C}$ wherein $V_{IN}$ is the output of the low pass filter and $V_C$ is a control coefficient) to produce a sharply increasing function of the absolute value of the output of the low pass filter.

DETAILED DESCRIPTION OF THE PREFERRED EMBODIMENTS

Briefly, the present invention is directed to a method, and associated circuitry and devices, for detecting and correcting thermal asperity transients in magneto resistive (MR) heads by providing a thermal asperity transient correction circuit in the MR head preamplifier. Thermal asperity transients at the MR head cause the reader output baseline or read head signal to temporarily shift to lower or higher voltages. The inventive method and apparatus provide transient control by providing a preamplifier with a correction circuit that includes a dynamic transient filter between the reader input gain stage and the reader output buffer of the preamplifier. A control signal is provided to the transient filter based on the output of the transient filter (or, in some cases, the input of the transient filter), and in one embodiment, the control signal includes a low pass filter that acts as a peak detector for the read head signal or MR output signal when the output voltage of the transient filter is applied to the low pass filter. The thermal asperity transient control method and apparatus of the invention can be utilized in hard disk drive systems with a wide variety of configurations, e.g., nearly any disk drive system using a read head preamplifier, and with numerous preamplifier configurations. As will become clear from the following description, the method and apparatus of the invention provide a system response that is dynamic in terms of both amplitude and time.

Figure 1:
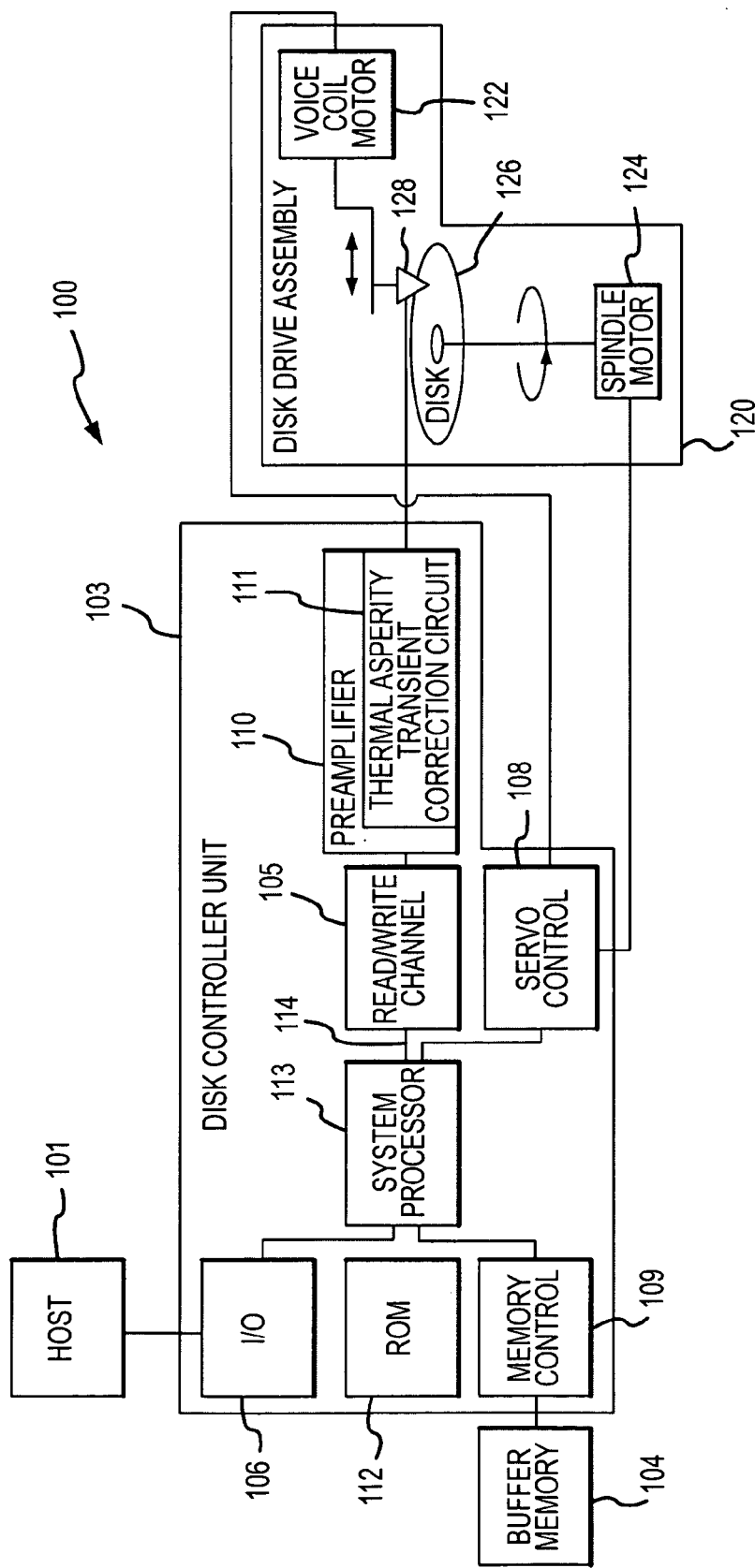
FIG. 1 illustrates in block diagram form a hard disk drive (HDD) system in which the present invention is implemented by including a thermal asperity transient correction circuit according to the invention in a read head preamplifier.

FIG. 1 illustrates in simplified form a hard disk drive system 100 in which the present invention is embodied but as noted above, the transient detection and correction features of the invention can be used in most hard disk drive assemblies that utilize a MR head 128 and preamplifier 110 and are not limited to use in the system illustrated. Disk drive system 100 includes a system processor 113 processing requests and commands from a host computer 101 that directs drive system 100 to perform specific behavior involving disk drive assembly 120. Examples include reading and writing data to disk drive assembly 120, providing state information such as defect tables, error status, and the like. Disk controller unit 103 includes data processing capacity as well as memory in the form of ROM 112 and buffer memory 104 to generate responses to received commands and requests as controlled by memory control 109. The generated responses return data, state information, and/or error codes depending on the particular operation being performed.

Disk drive system 100 implements physical mass storage typically on a plurality of magnetic disks and read/write head electronics for transferring data with the disks. As shown, disk drive system 100 includes read channel hardware for preprocessing and amplifying data read from the magnetic media as well as a spin motor for spinning the disks, and voice coil motor (VCM) for positioning the read/write head electronics at specific locations with respect to the disk surface(s). Servo control 108 generates drive signals that control the VCM 122 and/or spindle motor 124. These drive signals are in the form of precision higher power signals that drive the motors directly.

Host 101 typically comprises a data processing device such as a personal computer, server, workstation or the like that requires access to bulk data storage capabilities of disk drive assembly 120. Host 101 sends write commands and data via controller 103 to write data onto the disk(s) 126 as well as read commands to retrieve previously written data from disks within disk drive assembly 107. The read and write commands are provided via the read/write channel 105. On both read and write operations, the data transmitted from the host 101 to the disk controller 103 includes an indication of a specific location or set of locations on the disk drive assembly 120 that contains the data that is to be accessed.

The data that is exchanged through disk controller 103 is typically buffered in buffer memory 104 that is accessible via memory controller 109 and subsequently transmitted to disk assembly 120 or host 101. Buffer memory 104 is used to overcome differences between the speed at which host 101 operates as compared to the speed at which disk assembly 120 operates. In place of or in addition to buffer memory 104, a cache memory may be implemented by appropriate changes (e.g., tag management, hit/miss detection, and the like) to memory controller 109.

Servo control 108 regulates the spin speed of spindle motor 124 in response to commands from system processor 113. Although a head position control unit is often provided, the servo control 108 is shown to operate, e.g., through a voltage mode driver (not shown), to deliver controlled voltage signals in response to commands from system processor 113 to voice coil motor 122. These voltage signals cause voice coil motor unit 122 to move read/write head 128 into precision alignment with respect to the surfaces of disk 126.

Read channel circuit 105 communicates data and control information with the surface of disk 126. Control information such as servo control data, phase lock oscillator synchronization patterns, and servo bursts are encoded into portions of disk 126. This information is provided through read channel circuit 105 to system processor 113. System processor 113 uses this information to compute commands for servo control 108. The read/write head 128 comprises an MR head that is used to both record user data to and read user data back from the disk 126. Analog electrical signals that are generated by the head 128 in response to the magnetic signals recorded on the disk 126 are amplified to a level more useful for further processing by the circuitry 105 by a preamplifier 110 prior to delivery to read channel circuitry 105.

The disk 126 may have a surface that includes particles, defects, and other physical irregularities that can cause temporary or repeating thermal asperity events. The defects may take many forms but when collisions occur with the MR head 128 (or increase the cooling effect experienced by the MR head 128) the temperature of the head 128 increases (or decreases), which results in a rapid change in its resistance that causes a quick change or transient in the analog electrical signal output by the head 128 to the preamplifier 110.

To provide detection and correction of such thermal asperity transients, the preamplifier 110 includes a thermal asperity transient control circuit 111. In operation, the transient control circuit 111 functions to filter in the preamplifier 110 at least a portion of the signal from the head 128 caused by the thermal asperities such that the output signal, i.e., a filtered read head signal, from the preamplifier 110 can be processed by the read channel 105 with reduced risk of unacceptable increases in the bit error rate of the system 100. In one embodiment of the system 100, the correction circuit 111 is configured to remove or filter low frequency components of the transient for a period of time based on the decay of the MR head 128 temperature, such as until the output baseline of the MR head 128 recovers to an acceptable value.

Figure 2:
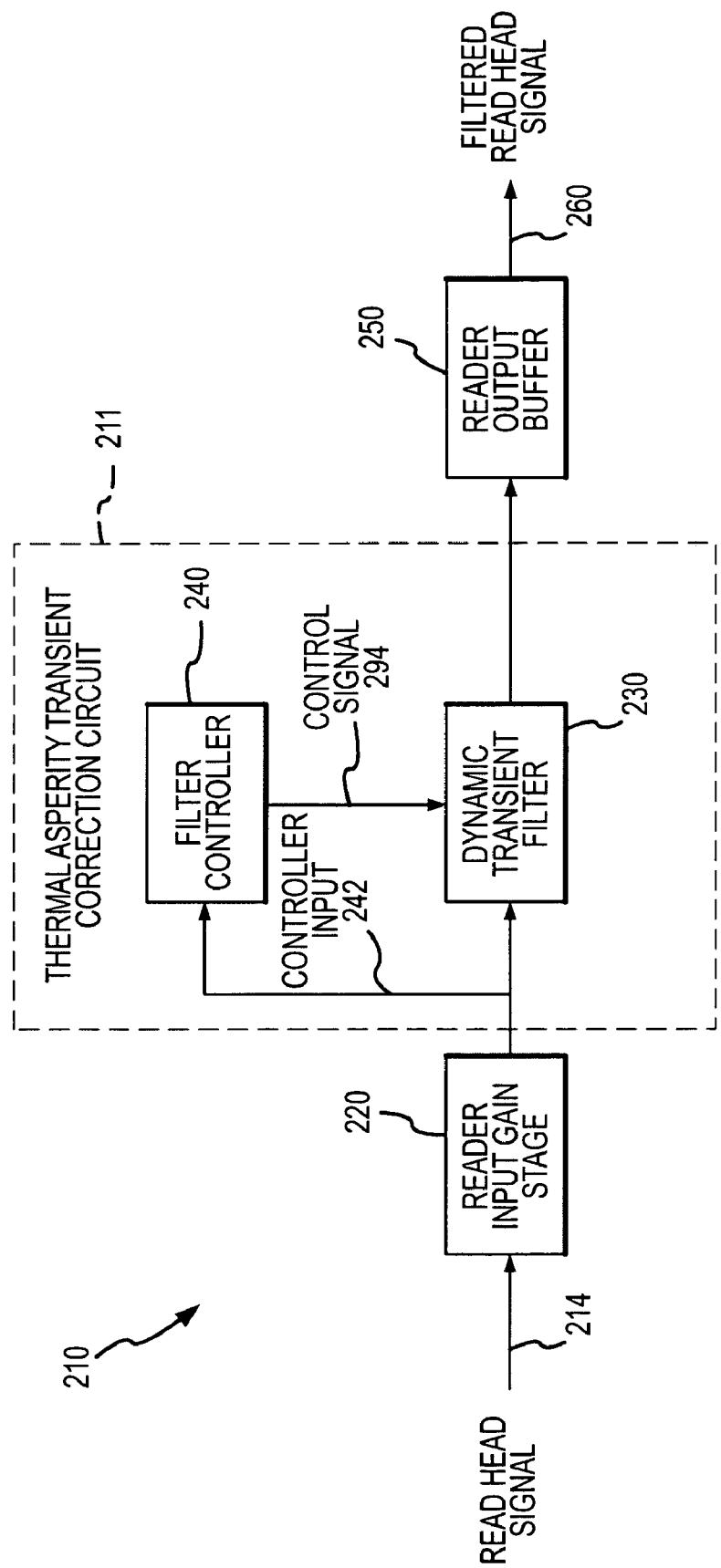
FIG. 2 illustrates in more detail a read head preamplifier (or a portion thereof) of such as may be utilized in the HDD system of FIG. 1 that incorporates a thermal asperity transient correction circuit according to the present invention.

In FIG. 2, an embodiment of a preamplifier 210 is provided, such as can be used in system 100 as preamplifier 110, that is adapted for detecting transients in read head output and for filtering signals affected by detected transients in a dynamic fashion. As shown, the preamplifier 210 includes a reader input gain stage 220 that receives and initially processes an analog read head signal 214 from a MR read head (such as head 128 of FIG. 1). The read head signal 214 and the output of the reader input gain stage 220 may include affects of a thermal asperity transient that can cause problems in processing by a read channel downstream of the preamplifier 210.

In this regard, a thermal asperity transient correction circuit 211 is provided downstream of the reader input gain stage 220 to detect transients and to filter the read head signal 214 based on the detected transients. The thermal asperity correction circuit 211 comprises generally a filter controller 240 that functions to receive a controller input signal 242 which as shown is the output of the reader input gain stage 220 or input to the dynamic transient filter 230. In other embodiments, the controller input 242 is taken as the output of the filter 230. The filter controller 240 processes the controller input 242 to detect a thermal asperity transient in the read head signal 214. In response, the filter controller 240 generates a control signal 294 to control operation of a dynamic transient filter 230.

The dynamic transient filter 230 is connected in series with and positioned between the reader input gain stage 220 and a reader output buffer 250. The reader output buffer 250 generates filtered read head signals 260, which are typically transmitted to a read/write channel or read/write controller for further processing. The transient filter 230 is dynamic in time as it filters the output of the reader input gain stage 220 in an ongoing fashion based on the control signals 294 generated by the filter controller 240. The transient filter 230 is also dynamic in the amount of filtering it performs based on the control signal 294. While the specific configuration of the filter controller 240 and the dynamic transient filter 230 may vary significantly to practice the invention, it may be useful in fully understanding the invention to provide at least one more particular embodiment of a preamplifier configured according to the invention.

Figure 3:
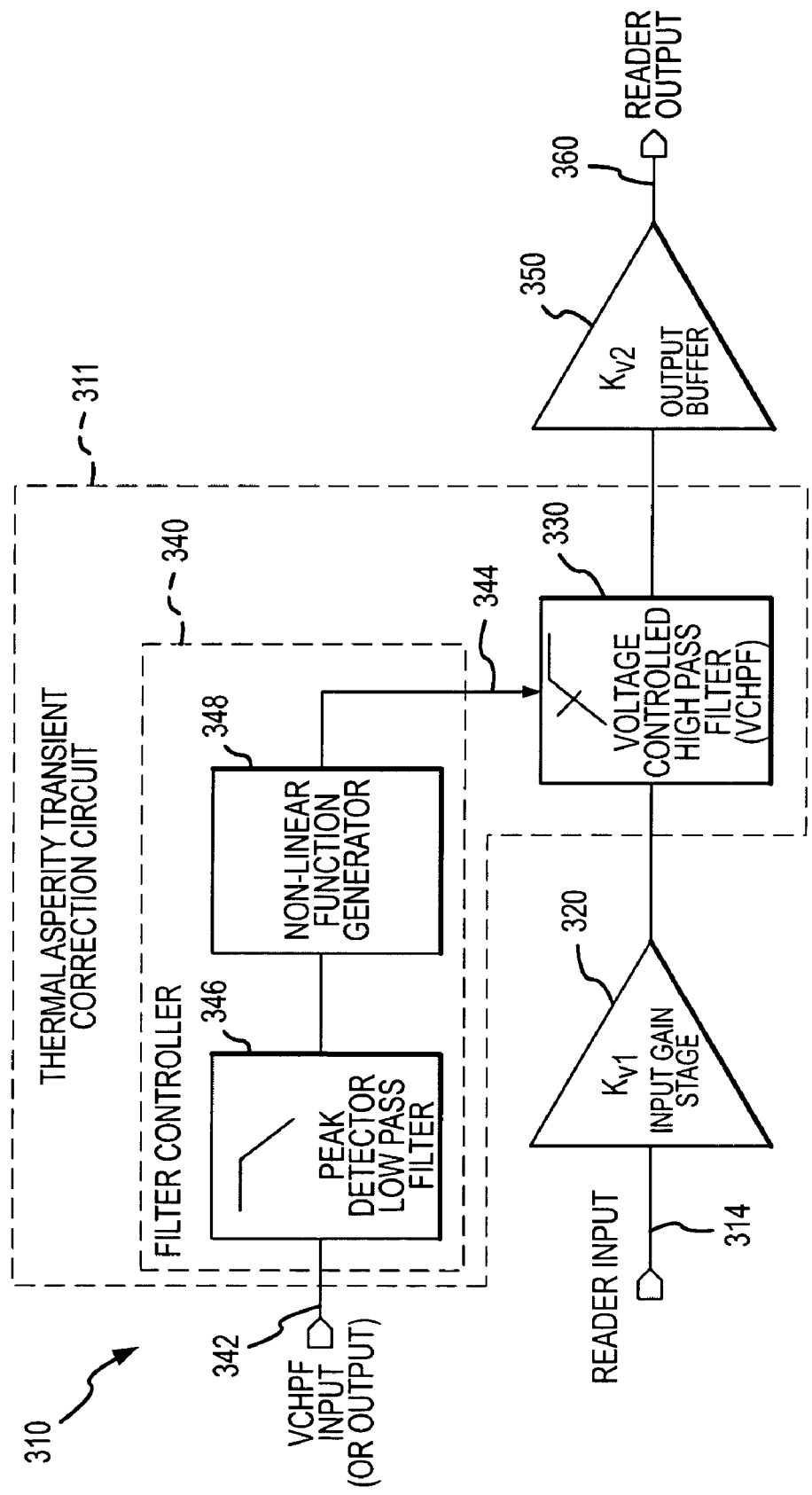
FIG. 3 illustrates one more specific embodiment of a read preamplifier according to the invention that provides a voltage controlled high pass filter between the input gain stage and output buffer of the preamplifier.

FIG. 3 illustrates one embodiment of a preamplifier 310 that is particularly useful in controlling thermal asperity transients in hard disk drive systems utilizing MR read heads. Significantly, the preamplifier 310 includes a thermal asperity transient correction circuit or device 311 that is at least partially positioned between an input gain stage 320 and an output buffer 350 of the preamplifier 310. As with typical preamplifiers, the input gain stage 320 receives a reader input signal 314 which it processes and passes to the output buffer 350. The output buffer 350 outputs a reader output signal 360, which differs from standard preamplifier outputs as the output 360 is a signal in which thermal asperity transients or transient effects have been filtered out.

As shown, the transient correction circuit 311 uses a voltage controlled high pass filter (VCHPF) 330 located between the reader input gain stage 320 and the reader output buffer 350. A filter controller 340 is provided for generating a control voltage 344 to control dynamically operation of the VCHPF 330 to filter the output of the input gain stage 320. As noted in FIG. 3, the input signal 342 of the filter controller 340 can be either input of the VCHPF 330 or the output of the VCHPF 330, and hence, the VCHPF control voltage 344 can be a function of VCHPF output as well as VCHPF input.

To generate the control voltage or filter control signal 344, the input signal 342 (i.e., the VCHPF 330 output voltage or input voltage) is applied to a peak detector 346. The peak detector 346 may take a number of forms to practice the invention, such as a low pass filter as shown in FIG. 3. The output of the peak detector 346, e.g., a low pass filter functioning as a peak detector, is applied to a non-linear function generator (NLFG) 348. The NLFG 348 is selected to generate a sharp increasing function of the absolute value of the input signal from the peak detector 346. The NLFG 348 may take a number of forms to generate the control signal 344 such as $(|V_{IN}|/V_C)^4$ or $e^{|V_{IN}|/V_C}$ or the like where $V_{IN}$ is the input of the NLFG 348 and $V_C$ is a control coefficient.

The output of the NLFG 348 is connected as control for the VCHPF 330, e.g., to provide the control signal or voltage 344.

During operation of the preamplifier 310, when there is no thermal asperity transient present in the reader input 314, the NLFG 348 is in a dead zone that is reflected in the control signal 344. In this operating condition, the VCHPF 330 sets the default low corner frequency of the read path. The thermal asperity transient correction circuit 311 responds to thermal asperity transients by removing low frequency components of the transient in the reader input 314. This filtering by the filter 330 occurs until the output baseline recovers to an acceptable value as evidenced by the reader input (or the input signal 342 to the filter controller 340. The corner frequency of the VCHPF 330 is a continuous function of the reader input 314 (e.g., the voltage control 344 for the VCHPF 330 is a function of the reader input 314). As a result, the corner frequency of the VCHPF 330 is at higher frequencies for higher amplitude transients. During operation, the VCHPF 330 corner frequency comes back to read path low corner frequency with the baseline recovery. As can be appreciated, the correction circuit 311 illustrated in FIG. 3 has a response that is dynamic in terms of amplitude and time.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention as hereinafter claimed.

We claim:

1. A preamplifier for processing read head signals to correct for thermal asperity transients, comprising:
    an input gain stage receiving a read head signal from the read head;
    a correction circuit connected to the input gain stage comprising a filter controller detecting a thermal asperity transient in the read head signal and generating a control signal based on the detecting and further comprising a filter operating dynamically based on the control signal to at least partially filter the detected thermal asperity transient from the read head signal to produce a filtered read head signal; and
    a reader output buffer receiving and transmitting the filtered read head signal,
    wherein the filter comprises a voltage controlled high pass filter and wherein the control signal comprises a voltage signal;
    wherein the filter controller receives as an input signal an output voltage of the voltage controlled high pass filter or an input voltage of the voltage controlled high pass filter;
    wherein the filter controller comprises a detector for identifying peaks in the input signal and a non-linear function generator, an output of the detector being applied to the non-linear function generator to generate the control signal for the filter; and
    wherein the non-linear function generator is adapted to produce an increasing function of an absolute value of the output of the detector, the non-linear function generator comprising $(|V_{IN}|/V_C)^4$ or $e^{|VIN|/VC}$ where $V_{IN}$ is the output of the detector and $V_C$ is a control coefficient.

2. The preamplifier of claim 1, wherein the filter is connected in series with the input gain stage and the reader output buffer.

3. The preamplifier of claim 1, wherein the detector comprises a low pass filter.

4. A method for dynamic correction of thermal asperity transients in magneto resistive (MR) read head output signals, comprising:
    receiving an output signal from an MR read head;
    processing the MR read head output signal through a gain stage to generate a filter input signal;
    detecting a peak in the filter input signal, the peak indicating a thermal asperity transient in the MR read head output signal, wherein the detecting comprises applying the filter input signal to a low pass filter;
    generating a control signal based on the peak detecting, wherein the control signal generating comprises applying an output of the low pass filter to a non-linear function generator to generate an increasing function of an absolute value of the output of the low pass filter, the non-linear function generator comprising $(|V_{IN}|/V_C)^4$ or $e^{|VIN|/VC}$ where $V_{IN}$ is the output of the detector and $V_C$ is a control coefficient; and
    filtering the filter input signal based on the control signal to produce a filtered MR read head signal.

5. The method of claim 4, wherein the filtering comprises applying a voltage controlled high pass filter to the filter input signal, the high pass filter operating dynamically based on the control signal.

6. The method of claim 4, wherein the filtering comprises removing low frequency components of the detected thermal asperity transient in the MR read head output signal.

7. A disk drive assembly with thermal asperity transient correction, comprising:
    a read head generating a read head signal based on reading data from a disk, the read head signal comprising a thermal asperity transient;
    a preamplifier connected to the read head processing the read head signal to generate a filtered read head signal, wherein the preamplifier comprising a reader input gain stage, a reader output buffer, and a correction circuit positioned between the reader input gain stage and the reader output buffer, the correction circuit adapted for detecting and at least partially filtering the thermal asperity transient from the read head signal; and
    a read channel for processing the filtered read head signal to identify the read data;
    wherein the correction circuit comprises a filter controller for detecting the thermal asperity transient and in response, generating a control signal and further comprises a voltage controlled high pass filter adapted to operate dynamically to perform the filtering of the thermal asperity transient based on the control signal;
    wherein input to the filter controller is an output voltage of the voltage controlled high pass filter or is an input voltage of the voltage controlled high pass filter;
    wherein the filter controller comprises a low pass filter adapted for detecting peaks in the filter controller input;
    wherein the filter controller further comprises a non-linear function generator for producing the control signal based on an increasing function of an absolute value of the output of the low pass filter; and
    wherein the non-linear function generator comprises $(|V_{IN}|/V_C)^4$ or $e^{|VIN|/VC}$ wherein $V_{IN}$ is the output of the detector and $V_C$ is a control coefficient.

8. A preamplifier for processing read head signals to correct for thermal asperity transients, comprising:
    an input gain stage receiving a read head signal from the read head;

a correction circuit connected to the input gain stage comprising a filter controller detecting a thermal asperity transient in the read head signal and generating a control signal based on the detecting and further comprising a filter operating dynamically based on the control signal to filter the read head signal on an ongoing basis to produce a filtered read head signal, wherein the filter is a voltage-controlled high pass filter, and wherein the amount of filtering comprises setting a default low corner frequency as a function of the read head signal, and wherein the voltage-controlled high pass filter is controlled by the control signal to vary the amount of the filtering over time to return a corner frequency of the filter to the default low corner frequency when a thermal asperity transient is not detected by the correction circuit, and wherein an amount of filtering performed by the filter varies with the control signal; and a reader output buffer receiving and transmitting the filtered read head signal.

9. The preamplifier of claim 8, wherein the filter controller receives as an input signal an output voltage of the voltage controlled high pass filter or an input voltage of the filter, wherein the filter controller comprises a detector for identifying peaks in the input signal and a non-linear function generator comprising an increasing function of an absolute value of the input signal from the detector, an output of the detector being applied to the non-linear function generator to generate the control signal for the filter.

10. The preamplifier of claim 9, wherein the non-linear function generator comprises $(|V_{IN}|/V_C)^4$ or $e^{|V_{IN}|/V_C}$ where $V_{IN}$ is the output of the detector and $V_C$ is a control coefficient.

* * * * *

UNITED STATES PATENT AND TRADEMARK OFFICE
CERTIFICATE OF CORRECTION

PATENT NO.        : 7,274,523 B2                                      Page 1 of 1
APPLICATION NO.   : 10/815135
DATED             : September 25, 2007
INVENTOR(S)       : Kemal Ozanoglu, Baris Posat and Roberto Alini It is certified that error appears in the above-identified patent and that said Letters Patent is hereby corrected as shown below:

Title page, item (75)     Inventors

"Roberto Allni" should be --Roberto Alini--

Column 8, line 62, "$(|V^{IN}|/V_C)^4$" should be --$(|V_{IN}|/V_C)^4$--

Signed and Sealed this

Third Day of March, 2009

JOHN DOLL
*Acting Director of the United States Patent and Trademark Office*